Jan. 7, 1930.   F. K. BENEDICT   1,742,843
MULTIPLE CAM
Filed Oct. 19, 1927

INVENTOR
Frederic K. Benedict
BY
ATTORNEY

Patented Jan. 7, 1930

1,742,843

UNITED STATES PATENT OFFICE

FREDERIC K. BENEDICT, OF BIG RAPIDS, MICHIGAN, ASSIGNOR, BY MESNE ASSIGNMENTS, TO HANCHETT MANUFACTURING CO., OF BIG RAPIDS, MICHIGAN, A CORPORATION OF MICHIGAN

MULTIPLE CAM

Application filed October 19, 1927. Serial No. 227,189.

This invention relates to a cam that is adjustable as to its effective radial throw and as to the extent of dwell or effective circumferential swell.

The inventive novelty resides in certain improved constructions and mode of operation whereby the adjustable member is held on the cam disk by a fastening that permits it to be easily and quickly detached, and as easily replaced, without manipulating any fastening screws or bolts. The detachable cam plate carries its own means for fine and accurate adjustment to variously position it in relation to the cam shaft.

An example of the use of such adjustable cams is found in automatic saw grinding machines, where their function is to impart the proper movement to the grinding wheel for producing a desired shape of the saw tooth. This cam can be set for a certain tooth shape and thereafter can be easily detached and kept for future use. Other adjustable cam members may meanwhile be used for grinding other saws with different shaped teeth. The feature of quick interchangeability, which is one of the characteristics of this invention, does not in the least impair the accuracy of a cam member that may have been set for a certain tooth shape and then detached, nor does it interfere with making any alterations of shape which the operator may subsequently desire to give it by further adjusting. A small number of detachable members may by this means be made to suffice for a large number of saw tooth shapes.

The claimed invention is capable of use in many other kinds of machinery with which those skilled in the art are familiar.

The cam adjusting device includes yielding means, such as a spring, to normally urge the detachable cam plate radially inward toward the shaft, and co-operating means, as for example, a set screw carried by the detachable plate, for adjustably positioning the plate in relation of the shaft. Auxiliary adjusting means, such as a threaded screw with a knurled head, may be carried by the cam disk, its end adjustably engaging the cam plate to facilitate the fine and accurate positioning of the cam and to hold it in position while the set screw above mentioned is being brought into position against the shaft.

With the foregoing and certain other objects in view, which will appear later in the specification, my invention comprises the devices described and claimed and the equivalents thereof.

In the drawings Fig. 1 is a side view of a cam embodying my invention.

Figure 1:
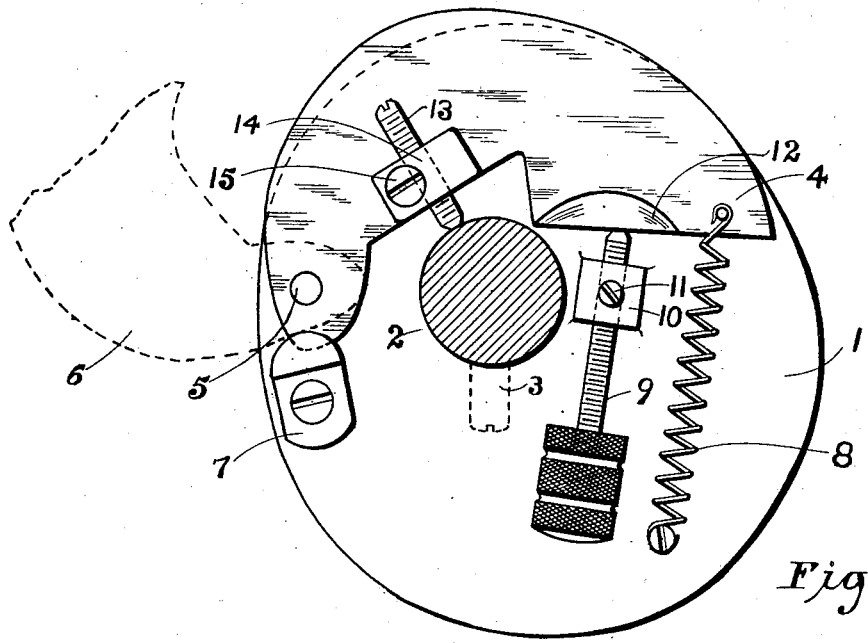

As is clearly shown in the drawings, numeral 1 indicates a cam disk having a hub $1^a$ mounted on a shaft 2 and secured thereto by a set screw 3 in the usual way. Upon the face of disk 1 is detachably mounted a cam plate 4 by means of a laterally projecting pintle 5. The cam plate may be swung around in its own plane about the pintle 5 to the position shown by dotted lines at 6 in Fig. 1, and part of the plate 4 when in its working position is engaged by a lug 7 and when the plate is moved to its inoperative position 6 it is disengaged from the lug 7 and can then be lifted off from the disk 1.

A suitable yielding means, such as spring 8, connects the disk and cam plate, as shown in Fig. 1, for normally urging the cam plate toward the shaft 2. The cam plate carries a set screw 13 which is threaded in a lug 14 and which can be clamped by a clamping screw 15.

By turning the set screw 13 the cam plate 4 may be forced outward against the tension of spring 8 and when the adjustment is completed the screw 15 is tightened.

The auxiliary means for plate 4 consists in a set screw 9 carried by a threaded boss 10 on disk 1, the boss having a set screw. The end of the adjusting screw 9 bears against the boss 12 on plate 4. Thus, by turning the knurl headed screw 9, which is permanently mounted on the disk 1, the adjustable plate 4 can be easily brought to its desired position and can be held there by means of the screw 11.

When the plate 4 is to be detached its set screw 13 is turned until is end takes against the shaft 2, clamping screw 15 is tightened, the upper end of spring 8 is detached, plate 4 is swung to the position shown by dotted lines in Fig. 1 and is lifted off from the dowel pin 5.

Another plate similar to 4, but with a different curvature can be put in place for a change of work.

Figures 2, 3:
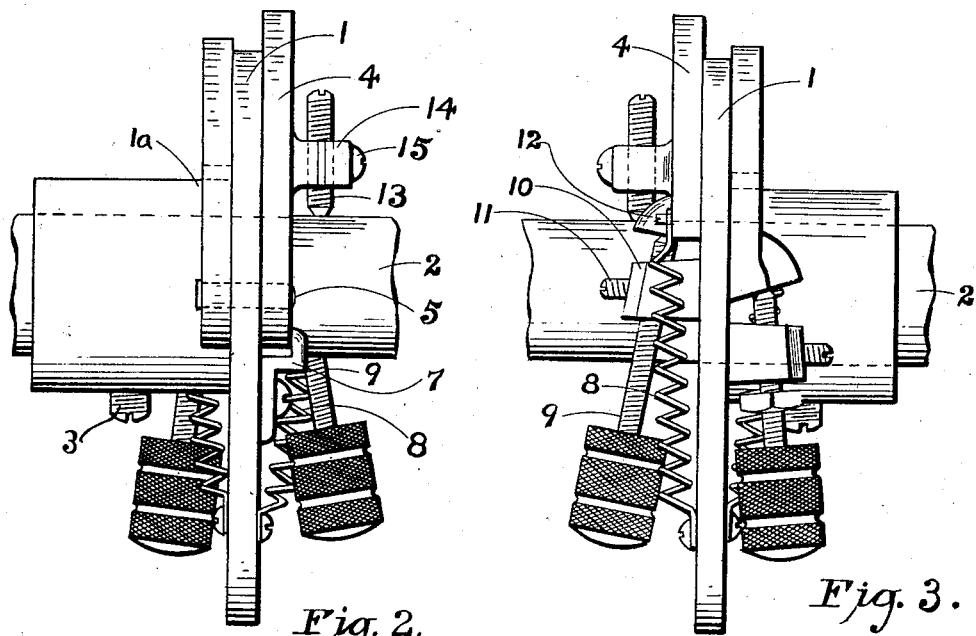
Fig. 2 is an edge view showing a cam as seen from the left hand side in Fig. 1.
Fig. 3 is a similar view from the right hand side in Fig. 1.

If desired the idea involved in this invention as claimed can be extended to include another adjustable plate 4, as shown at the left hand side in Fig. 2 and at the right hand side in Fig. 3. Ordinarily, however, an adjustable plate on one side only of the disk 1 is sufficient for all practical purposes.

Having thus described my invention, what I claim and desire to secure by Letters Patent is:

1. The combination with a shaft and a disk thereon, of a cam plate detachably mounted on said disk, retaining means engaging said plate to hold it on said disk when the plate is in operating position and to release it when moved to inoperative position, yielding means normally urging the cam plate toward the shaft and means for adjustably positioning said plate in relation to the shaft.

2. The combination with a shaft and a disk thereon, of a cam plate detachably pivoted on said disk, retaining means engaging said plate to hold it on said disk when the plate is in operative position and to release it when moved to inoperative position, yielding means normally urging the cam plate toward the shaft, means on the cam plate for adjustably positioning said plate in relation to the shaft, and an auxiliary adjusting means carried by the disk and engaging the cam plate, for the purposes set forth.

3. The combination with a shaft and a disk thereon, of a cam plate detachably pivoted on said disk, a lug on said disk adapted to engage and hold said plate on said disk when the plate is in operating position and to release it for removal when moved to inoperative position, a spring connecting said disk and cam plate for normally urging the cam plate toward the shaft and a set screw threaded on the cam plate for adjustably positioning said plate in relation to the shaft.

4. The combination with a shaft and a disk thereon, of a cam plate detachably pivoted on said disk, retaining means engaging said plate to hold it on said disk when the plate is in operative position and to release it when moved to inoperative position, yielding means normally urging the cam plate toward the shaft, and a set screw threaded on the cam plate for adjustably positioning said plate in relation to the shaft, and an auxiliary set screw carried by the disk and adjustably engaging the cam plate, for the purposes set forth.

5. The combination with a shaft and a disk thereon, of a cam plate detachably pivoted on said disk, yielding means normally urging the cam plate toward the shaft, and means on the cam plate for adjustably positioning said plate in relation to the shaft.

In testimony whereof, I affix my signature.

FREDERIC K. BENEDICT.